UNITED STATES PATENT OFFICE.

CHARLES E. ROGERS, OF DETROIT, MICHIGAN.

STERILE BUTTER-FAT AND METHOD OF PRODUCING THE SAME.

1,264,336.  Specification of Letters Patent.  Patented Apr. 30, 1918.

No Drawing.  Application filed January 17, 1912.  Serial No. 671,764.

*To all whom it may concern:*

Be it known that I, CHARLES E. ROGERS, a citizen of the United States, residing at Detroit, county of Wayne, State of Michigan, have invented a certain new and useful Improvement in Sterile Butter-Fat and Methods of Producing the Same, and declare the following to be a full, clear, and exact description of the same, such as will enable others skilled in the art to which it pertains to make and use the same, reference being had to the accompanying drawings, which form a part of this specification.

This invention relates to a method of sterilizing butter-fat and to the product resulting from such sterilization and the object of the invention is a sterile, sweet butter-fat that will keep for an indefinite period and in all climates in a palatable condition without the use of cold storage or other method of preventing deterioration and that may be handled commercially either in bulk or in the same manner as ordinary canned goods.

Cows' butter, as known commercially at the present time, is subject to comparatively rapid deterioration due to the presence and growth of bacteria therein causing rancidity, putridity, etc., depending upon the quantity and kind of germs which it contains. These vegetating organisms are present in large numbers in milk and cream, ripened cream often containing 500,000,000 organisms per cubic centimeter representing a germ content that has no parallel in any natural material and it naturally follows that butter, as manufactured by any process heretofore known, contains bacteria in greater or less numbers resulting in the imperfections and deteriorations in the product as heretofore mentioned.

The bacteria in butter and cream are generally of the acid forming and casein digesting groups and the number found in butter is much less than is found in cream due to the much smaller amount of milk serum in the butter by which the organisms are fostered. It thus becomes evident that the quantity of bacteria found in butter is directly dependent upon the amount of serum and casein found therein, or in other words, is governed by the amount of butter-fat present which is not well adapted for bacterial food. To illustrate farther—average milk contains about $87\frac{1}{2}\%$ of water $3\frac{1}{2}\%$ butter-fat, and 9% of other solids while unsalted butter contains about 85% butter-fat, 14% moisture, and 1% casein from which it may be readily seen that the bacteria fostering elements are very much greater in milk than in butter.

Various methods have been proposed tending to produce a butter bearing a smaller quantity of bacteria and therefore a product that will keep for a longer period of time without deterioration among which may be mentioned the pasteurization of the cream and the destruction of the germ life therein prior to the making of the butter and also the method of storing butter at low temperatures where germ growth is suspended, the latter method being the one most commonly employed.

Neither of these methods, or any other method known up to the present time, fully accomplish the desired result as butter made from pasteurized cream may still become infected and butter removed from storage deteriorates fully as rapidly as it would before being placed therein.

The product resulting from the process of manufacture hereinafter outlined contains no germ fostering element and may be sold to the trade either in bulk or in packages but preferably in hermetically sealed packages in which form it cannot become contaminated and may be purchased with the assurance that the contents are in perfect condition and, without entering into a description of those commonly known steps by means of which ordinary butter is usually produced, the process consists, generally of the following steps—First—the heating of such butter until it becomes liquid in form and the casein and curd content becomes hardened.—Second—separating the hardened casein and curd from the liquid either by straining or filtering or analogous method.—Third—subjecting the liquid to a greater degree of heat to free it of moisture.—Fourth—packaging the liquid.—Fifth—hermetically sealing the packages.—Sixth—subjecting the hermetically sealed packages to a degree of heat sufficient to sterilize the contents.

It is to be noted that the process consists "generally" of the steps as above outlined, but variations in said steps or their sequence caused by variations in the condition of the material to be acted upon or in slight variations that may be desired in the product as hereinafter shown may be made without departing from the spirit of this invention.

The first step—that of melting the butter, etc.,—may be accomplished in any convenient receptacle, such as a water or steam jacketed tank that are at present in use for analogous purposes and the degree of temperature required ranges from about 110 degrees to about 160 degrees Fahrenheit.

The object of this step is to harden the solids, such as casein, etc., in order that they may be readily separated from the liquid butter-fat and the desirability of such separation is found in the fact such material in butter fosters bacteriological growth as heretofore shown and in the further fact that the retention of such material would result in a product that was streaked and filled with white lumps which is undesirable. Its retention would also cause the finished product to have a cooked taste but its removal at this stage and temperature obviates this difficulty as such taste is not imparted to milk serum or casein, etc., at temperatures up to substantially 160 degrees F. and consequently the butter-fat is unaffected. However, as butter-fat does not readily take on such a taste, the temperature may be carried as high as 180 degrees F. without particular detriment to the product and may be desirable for reasons hereinafter given.

Butter made from pasteurized cream may not require a temperature above 110 degrees F. as the casein, etc., contained therein has previously been hardened in the pasteurizing process and this low temperature will be sufficient to melt the butter and the casein, etc., removed as heretofore mentioned while with butter made from cream not so treated a higher temperature will be required to harden such substances. At the temperatures mentioned the hardened substances will float in and on the surface of the liquid but with a temperature of substantially 180 degrees F., these substances will settle in the bottom of the receptacle which is a condition that may be found desirable prior to taking the next step.

The second step—that of separating the hardened casein and curd from the liquid butterfat, may be accomplished in several well known ways, either by skimming, or straining through fine wire mesh or several layers of cheese cloth, or by passing through a filter press.

Should the first step be performed at a temperature of substantially 180 degrees F. and the hardened material settled in the bottom of the tank, the liquid may be readily drawn off from the tank resulting in a separation of the casein and curd from the liquid without the necessity of straining. This method of performing the second step may be as readily accomplished as any of the other methods mentioned and either of the said methods may be easily performed by any one familiar with the apparatus required, which is well known and at present in use for analogous purposes.

The third step, that of freeing the liquid butter-fat of moisture, is utilized in case the product desired is substantially pure, sterile butter-fat, and may be accomplished by subjecting the liquid to heat of substantially 212 degrees F. by means of a water or steam jacketed tank or similar well known apparatus.

In case moisture or both salt and moisture are desired in the product, this step may be dispensed with and necessarily so if the butter treated be salted, in which case the removal of the moisture would result in the product containing undissolved salt.

The fourth step, that of packaging the liquid, may be accomplished by means of any of the various filling machines now on the market, preferably such as are in use in the filling of cans with condensed milk, etc., for the reason that the preferred package for the finished product is a metal can.

The fifth step, that of hermetically sealing the packages, may also be readily accomplished by those well known methods now employed in the manufacture and packaging of canned goods such as condensed milk, and other food products, and consists in closing the opening through which the cans are filled either by solder alone or by soldering a metal over the opening, the method employed depending upon the size of the opening. Any other suitable method may also be employed as desired.

The sixth step, that of subjecting the hermetically sealed packages to a degree of heat sufficient to sterilize the contents, consists simply in maintaining the packaged material in a temperature of approximately 210 degrees F. for about thirty minutes or a less degree of heat for a longer period of time. This step may be performed by means of any of the well known sterilizers now on the market adapted to sterilize canned goods. Should it be desired to market the product herein described in bulk instead of in packages, the fourth and fifth steps may be dispensed with, in which event the liquid would be sterilized after the second or third steps and the sterilizer used may be of simpler form than the type above mentioned as no cans need be handled. It thus becomes evident that the "sterilizing of the liquid" is the essential characteristic of the sixth step and the liquid may be packaged or not so packaged without departing from the spirit of this invention.

It is to be noted that approximately 99% of the butter produced in this country is colored with a butter color. Such butter forms the raw material from which the hereindescribed product is made and, as color is desirable in the product and as neither of the steps hereinbefore outlined are adapted to remove such color, the product resulting from such steps will also be colored. Therefore, it is to be understood that by "substantially pure" butter or butter-fat is meant a butter or butter-fat that approximates purity so far as it may be practicable or necessary to accomplish the object of the invention. However, butter that is not artificially colored may be treated by this process as readily as that which is.

From the foregoing description it is believed evident that the product resulting from the process described or the variations thereof will keep for a much longer period of time than ordinary butter even though it was not packaged, due to the absence of bacterial food and its sterile condition, but if packaged and hermetically sealed, it will keep for an indefinite period and in all climates and will be found useful for all purposes for which butter or butter-fat is or may be used.

What I claim and desire to secure by Letters Patent of the United States is—

1. The herein described process which consists in heating butter until it is liquefied and the casein and curd content becomes hardened, separating the hardened material from the liquid, and finally heating the liquid under the exclusion of air until it becomes sterile.

2. The herein described process which consists in heating butter until it is liquefied and the casein and curd content becomes hardened, separating the hardened material from the liquid, packaging the liquid, and finally subjecting the packages to a degree of heat sufficient to sterilize the contents while excluded from atmosphere.

3. The herein described process which consists in heating butter until it is liquefied and the casein and curd content becomes hardened, separating the hardened content from the liquid, packaging the liquid, hermetically sealing the packages, and finally subjecting the sealed packages to a degree of heat sufficient to sterilize the contents.

4. The method of producing substantially pure butter-fat which consists in heating unsalted butter until it is liquefied and the casein and curd content becomes hardened, separating the hardened content from the liquid, subjecting the liquid to a degree of heat sufficient to free it of moisture, and finally heating the substantially pure butter-oil while excluded from atmosphere until it becomes sterile.

5. The herein described process which consists in heating unsalted butter until it is liquefied and the casein and curd content becomes hardened, separating the hardened content from the liquid, freeing the liquid of moisture, packaging the liquid, and finally sterilizing the liquid while in the packages and excluded from unsterilized air.

6. The herein described process which consists in heating unsalted butter until it is liquefied and the casein and curd content becomes hardened, separating the hardened content from the liquid, freeing the liquid of moisture, packaging the liquid, hermetically sealing the packages, and finally sterilizing the liquid while in the sealed packages.

7. The process of treating butter which consists first in the liquefying thereof, second separating the casein and curd content therefrom, and finally sterilizing the liquid while excluded from unsterilized air.

8. The process of treating butter which consists first, in the liquefying thereof, second, separating the casein and curd content from the liquid, third, freeing the liquid of moisture, and finally sterilizing the liquid in sealed packages.

9. The process of treating butter which consists, first, in the liquefying thereof at a temperature not exceeding 180 degrees Fahr., second, separating the casein and curd content from the liquid while heated, third, subjecting the clarified liquid while excluded from unsterilized air to a temperature of substantially 240 degrees Fahr. until it is sterilized.

10. The process of treating butter which consists, first, in the liquefying thereof at a temperature not exceeding 180 degrees Fahr., second, separating the casein and curd content from the liquid, third, subjecting the clarified liquid to a temperature of substantially 212 degrees Fahr. to free it of moisture, and finally subjecting the clarified, moisture free, liquid under the exclusion of air to a temperature of substantially 240 degrees Fahr. until it is sterilized.

In testimony whereof, I sign this specification in the presence of two witnesses.

CHARLES E. ROGERS.

Witnesses:
 RICHARD ALSPAS,
 CHARLES E. WISNER.